United States Patent [19]

Ford

[11] Patent Number: 5,123,572
[45] Date of Patent: Jun. 23, 1992

[54] COFFEE GRINDER DUMP CYLINDER

[75] Inventor: David F. Ford, Springfield, Ill.

[73] Assignee: Bunn-O-Matic Corporation, Springfield, Ill.

[21] Appl. No.: 628,641

[22] Filed: Dec. 12, 1990

[51] Int. Cl.$^5$ .............................................. B67D 5/52
[52] U.S. Cl. ................................. 222/135; 222/272; 222/308; 222/368; 241/100
[58] Field of Search ............... 241/100; 222/272, 295, 222/307, 14 308, 368, 271, 135

[56] References Cited

U.S. PATENT DOCUMENTS

| | | | |
|---|---|---|---|
| 241,307 | 5/1881 | Corwin | 222/308 X |
| 454,483 | 1/1891 | Warnock . | |
| 471,670 | 3/1892 | Jones et al. | 222/308 |
| 845,572 | 2/1907 | Peck | 222/308 X |
| 950,286 | 2/1910 | Hauty . | |
| 1,560,824 | 11/1925 | Karraz et al. . | |
| 2,113,460 | 4/1938 | Chott | 222/308 |
| 2,282,110 | 5/1942 | Angell | 222/308 |
| 2,339,908 | 1/1944 | Brewer et al. | 221/107 |
| 2,560,826 | 7/1951 | Schuhmann | 241/100 X |
| 4,084,729 | 4/1978 | Epple | 222/307 |

FOREIGN PATENT DOCUMENTS 213069  5/1956  Australia .............................. 222/272

*Primary Examiner*—Michael S. Huppert
*Assistant Examiner*—Gregory L. Huson
*Attorney, Agent, or Firm*—Trexler, Bushnell, Giangiorgi & Blackstone, Ltd.

[57] ABSTRACT

An adjustable measuring apparatus for repeatably measuring a selected volume. The adjustable measuring apparatus includes a hollow sleeve having two sleeve apertures formed through opposed spaced apart surfaces of said sleeve. A first sleeve aperture formed on a top side of the sleeve is formed for receiving material therethrough. A second sleeve aperture formed on a bottom surface of the sleeve is formed for dispensing material therethrough. A cylinder is rotatably retained in the sleeve and has a cylinder aperture formed therethrough for selectively communicating with the first and second sleeve apertures. A piston is adjustably retained in the cylinder for adjustably controlling a volume of the cylinder. An adjustment member is provided and attached to the piston for adjustably positioning said piston in the cylinder. A handle is attached to the cylinder independent of the adjustment member for rotating the cylinder positioned in the sleeve about a major axis for selectively communicating the cylinder aperture with one of the two sleeve apertures. The adjustment member is concealed behind the handle and accessible therethrough for adjustment of the piston in the cylinder for adjustably controlling the volume of the cylinder.

10 Claims, 2 Drawing Sheets

COFFEE GRINDER DUMP CYLINDER

BACKGROUND OF THE INVENTION

This invention relates to an adjustable measuring apparatus.

Coffee brewed from freshly ground coffee beans is an increasingly popular beverage. It is desirable to brew coffee consistently to satisfy consumer expectations. Consistency depends, in part, upon consistency in measuring the amount of coffee beans used in brewing.

Many devices have been employed to achieve consistent measurements. Simplest of all is a measuring spoon or cup which may be dipped into a bulk storage container of coffee beans and emptied into a grinder However, this typically requires multiple measurings of the spoon or cup to accumulate the desired quantity of coffee beans to be ground and brewed. Especially in commercial applications such measuring is prone to error and is not efficient.

It is desirable to provide a measuring apparatus which can be adjusted to measure a single unit of coffee beans to be disposed in a grinder and used for brewing. It is also desirable to position such a measuring apparatus between a gravity flow bean hopper and a grinding unit such that the beans flow directly from a storage hopper into the measuring apparatus whereupon a unit is measured and then emptied into a grinding apparatus. Such a measuring apparatus also protects the coffee beans from contamination such as contact with foreign substance or contact by human hand since the beans are stored, measured and ground in a closed loop system.

A prior art device attempted to provide a measuring apparatus to overcome the above noted problems. The prior art device includes a hollow rotatable cylinder formed with an opening for receiving coffee beans from a gravity feed hopper positioned thereabove. The cylinder rotates inside of a sleeve to dump the measure of coffee beans out through a second opening. A piston positioned inside of the cylinder is adjustable for controlling the volume of beans measured in the cylinder. A rod is provided and attached to the piston for moving the piston axially inside of the cylinder. A stationary pin attached to an inside surface of the cylinder cooperatively engages a helical groove formed on the outside surface of the piston such that rotary movement of the rod turns the piston thereby axially moving the piston through the cylinder.

However, the prior art device noted above does not overcome all of the aforementioned problems. For example, the helical groove formed on the outside surface of the piston is prone to fouling;. The helical groove becomes exposed to coffee beans and attendent particular matter when the piston is moved to decrease the volume of the measurement whereupon particles of coffee bean flowing from the hopper may become lodged therein. Further, the helical groove is formed on the outside of the piston and defines a steep angular path which is not conducive to fine adjustments. Further, the rod attached to the piston and attached to handle on the outside of the grinder housing required a set screw in order to retain a selected bean measurement piston/cylinder adjustment. If the set screw is not properly tightened after the adjustment rotation of the cylinder to dump coffee beans disposed therein may result in misadjustment of the cylinder.

Heretofore, prior measuring apparatus have been complicated and susceptible to inadvertent and undesired adjustments. Similar to the desirability of a single unit measuring device, a measuring device which is not prone to accidental adjustments is extremely desirable especially in the hectic commercial food preparation environment.

OBJECTS AND SUMMARY OF THE INVENTION

A general object of the present invention is to provide an adjustable measuring apparatus which adjustably and repeatably measures a desired volume of material.

Another object of the present invention is to provide an adjustable measuring apparatus which may be employed with a material hopper and a grinding apparatus to measure a desired volume from the material hopper and quickly and efficiently deposit the material into the grinding apparatus.

Yet a further object of the present invention is to provide an adjustable measuring apparatus which conceals an adjustment mechanism to prevent accidental undesirable adjustments.

Briefly, and in accordance with the foregoing, the present invention comprises an adjustable measuring apparatus for repeatably measuring a selected volume of a desired material. The adjustable measuring apparatus includes a hollow sleeve having first and second sleeve apertures formed through opposed spaced apart surfaces of the sleeve. The first sleeve aperture formed on a top side of the sleeve is formed for receiving material under force of gravity therethrough from the material source thereabove, a second sleeve aperture formed on a bottom surface of the sleeve is formed for dispensing material under force of gravity therethrough. A cylinder is rotatably retained in the sleeve and has a cylinder aperture formed therethrough for selectively communicating with the first and second sleeve apertures. A piston is adjustably retained in the cylinder for adjustably controlling a volume of the cylinder. An adjustment member is provided and engaged with the piston for adjustably positioning the piston in the cylinder. A handle and a hollow rod are attached to the cylinder independent of the adjustment member for rotating the cylinder in said sleeve about a major axis for selectively placing the cylinder aperture in communication with one of the two sleeve apertures. The adjustment member is concealed inside of the rod and accessible through the handle for adjustment of the piston in the cylinder for adjustably controlling the volume of the cylinder.

BRIEF DESCRIPTION OF THE DRAWINGS

The features of the present invention which are believed to be novel are set forth in the appended claims. The organization and manner of the operation of the invention together with the further objects and advantages thereof, may be understood best by reference to the following description taken in connection with the accompanying drawings wherein like reference numerals identify like elements in which:

DETAILED DESCRIPTION OF THE ILLUSTRATED EMBODIMENT

Figure 1:
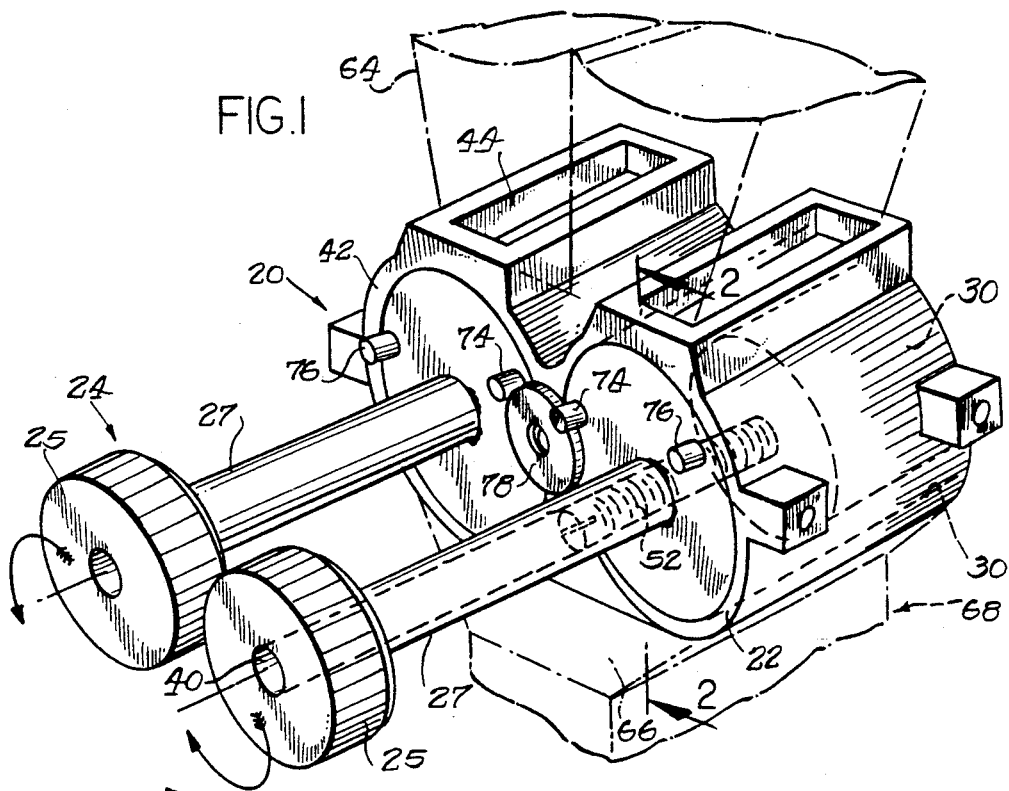
FIG. 1 is a perspective view of a dual cylinder adjustable measuring apparatus showing one cylinder of the apparatus and adjustment means and a piston retained therein.

While this invention may be susceptible to embodiment in different forms, there is shown in the drawings and will be described herein in detail, a specific embodiment with the understanding that the present disclosure is to be considered an exemplification of the principles of the invention and is not intended to limit the invention to that as illustrated.

An adjustable measuring apparatus 20 is illustrated in the perspective view of FIG. 1. The measuring apparatus 20 includes a cylinder member 22 positioned inside of a sleeve 42 in a rotatable relationship. An inside diameter of the sleeve 42 and an outside diameter of the cylinder 22 are substantially equal and are represented in FIG. 1 by a common diameter 23. A hollow handle member 24 including a hand wheel 25 and a hollow rod 27 is attached to an end of the cylinder member 22. A cylinder aperture 26 is formed through a wall 28 of the cylinder 22. The cylinder aperture 26 is an elongated generally rectangular aperture providing access to the inside of the cylinder member 22.

A piston 30 is adjustably retained inside of the cylinder member 22 and is sized and dimensioned for a close yet movable fit. Adjustment means 32 and an axial retention member 34 attached to the inside of the cylinder member 22 coaxial with the cylinder member 22 and the piston 30 along a major axis 36. The adjustment means 32 is axially retained in the axial retention member 34 and moves the attached piston 30 though the cylinder member 22 along the major axis 36 (as indicated by arrow 38). Control of the adjustment means 32 is accessed through an access bore 40 formed through the handle member 24 generally coaxial with the major axis 36.

Figure 2:
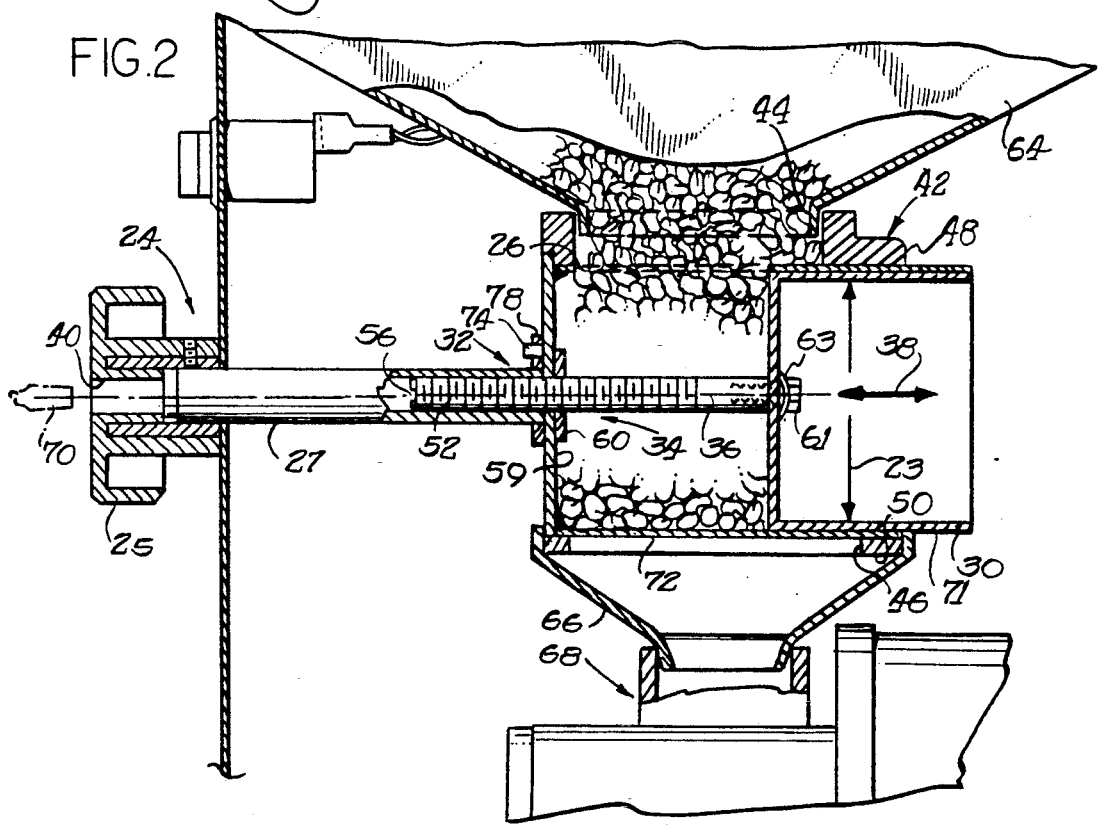
FIG. 2 is a partial fragmentary side sectional view of the adjustable measuring apparatus taken along line 2—2 in FIG. 1 positioned between a gravity feed hopper and a grinder.

The sleeve 42 illustrated in FIG. 1 and the partial fragmentary side sectional view of FIG. 2 which is taken along 2—2 in FIG. 1 shows a measuring apparatus which can accommodate two hoppers and is formed with a double sleeve which accommodates two cylinders therein. Further, although only the measuring apparatus 20 is illustrated in FIG. 1, additional elements have been added, including a dispensing chute 64 and a receiving area 66 of a grinding apparatus 68, in the illustrations to provide further clarification of the present invention.

The sleeve 42 is formed with a first sleeve aperture 44 and a second sleeve aperture 46. The first sleeve aperture 44 is formed through a top side 48 of the sleeve 42 and the second sleeve aperture 46 is formed through a bottom side 50 of the sleeve 42 opposite the first sleeve aperture 44. The first and second sleeve apertures 44,46 are sized and dimensioned to closely approximate the dimensions of the cylinder aperture 26. The adjustment means 32 are not independent of the hollow rod 27 and are not independent of the cylinder 22 and therefore, when the cylinder 22 is rotated inside of the sleeve 42 by turning the handle 25 attached to the rod 27, the desired adjustment of the piston 30 is maintained.

As shown in FIG. 2, the adjustment means 32 includes a threaded shaft member 52 and a tool engaging head 56. A fastener 61 and wave washer 63 are employed to engageably secure the shaft 52 to the piston 30. The threaded shaft member 52 engages a threaded nut 60 attached to an inside surface 59 of the cylinder 22 coaxial with the major axis 36. Since the threaded shaft 52 is captively axially retained by the fastener 61 and lock or wave washer 63 rotation of the shaft member 52 engaging the threaded nut 60 produces axial movement 38 of the piston 30 along the major axis 36 inside of the cylinder 22. Axial movement 38 of the piston 30 adjusts the size of a measured volume or measuring chamber 62 formed in the cylinder member 22 between opposing faces of the axial retention member 34 and the piston 30. Therefore, the measured volume 62 can be repeatably and retainably adjusted to a desired measurement by moving the piston 30 along the major axis 36.

The capacity of the measuring chamber 62 is adjusted by inserting a tool 70 (shown in phantom line in FIG. 2) and engaging the tool engaging head 56 of the adjustment means 32. Rotation of the threaded shaft member 52 with the threaded nut 60 axially moves 38 the piston 30 through the cylinder 22. Rotation of the threaded shaft member 52 in one direction advances the piston 30 through the cylinder 22 and rotation in the opposite direction forces the piston 30 to recede through the cylinder 22. The threads are formed at an angle to promote relatively precise adjustment of the volume of beans to be measured in the cylinder. The piston 30 has a key 72 attached thereto on an outside surface 71 of the piston 30. The key 72 is a narrow piece of material having generally the same dimensions as a cylinder aperture 26. The key mates with the cylinder aperture 26 by being inserted therein when the cylinder 22 is inserted in the sleeve 42 thereby preventing independent rotation of the piston 30 when the cylinder 22 is rotated. The fastener 61 attaches the piston 30 to the adjustment screw 52. While the adjustment screw 52 is threadedly advanced by means of engagement with the threaded nut 60, the adjustment screw 52 rotates with respect to the piston 30 since the key 72 of the piston 30 is engaged with the aperture 26. The fastener 61 and the washer 63 retain the adjustment screw 52 in a rotatable attachment with the piston 30. Some friction is maintained between the adjustment screw 52 and the piston 30 by the wave washer 63 under the screw 61 to retain the desired adjustment even when the measuring apparatus 20 is subjected to vibrational forces such as when the grinder is activated. Such adjustment retaining thread angle obviates the need for adjustment retaining set screws or other adjustment hindrances.

The handle member 24 also conceals the shaft 52 to prevent inadvertent and undesirable adjustment of the shaft 52. Although concealed, adjustment of the shaft 52 is readily accomplished by inserting the tool 70 through the access bore 40 to engage the tool engaging head 56. Concealed as such, even inadvertent contact with the handle member 24 is unlikely to move the piston 30 causing an accidental adjustment of the the volume of measuring chamber 62.

Figure 4:
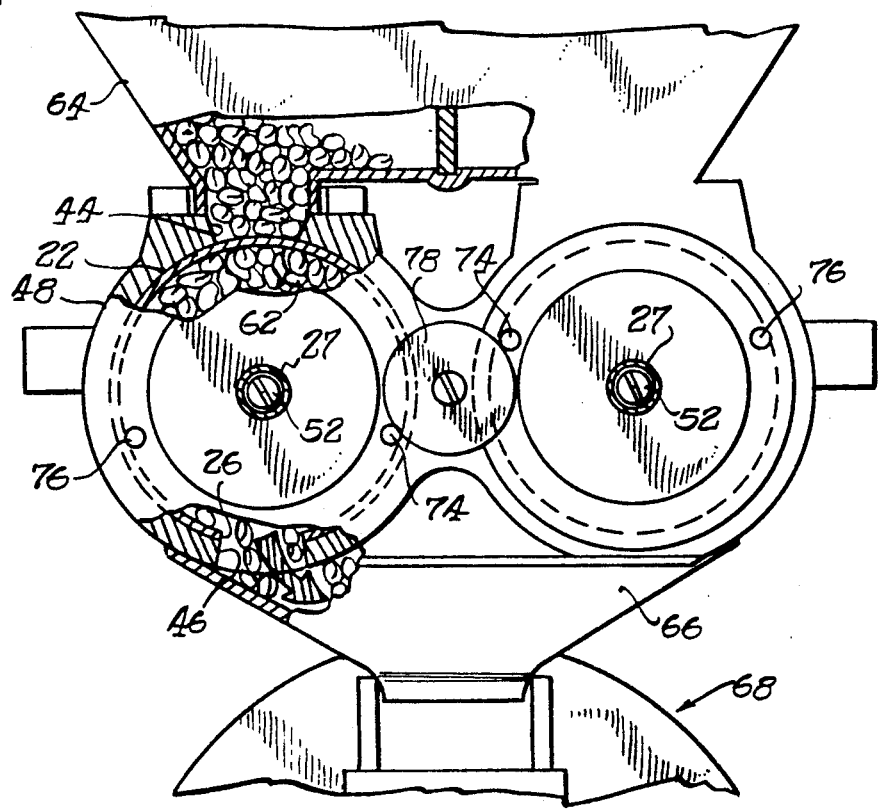
FIG. 4 is a cross-sectional end view of the apparatus in which the cylinder has been rotated 180 to dispose the material dispensed into the measuring chamber into the grinder.

First and second stop members 74, 76 limit the degree of rotation of the cylinder 30. The first stop member 74 engages a stop washer 78 to align the cylinder aperture 26 with the sleeve aperture 44. In this position beans are sequestered in the measuring chamber 62. When the handle member 24 is rotated, thereby rotating the attached cylinder 30, the second stop member 76 is rotated into engagement with the stop washer 78. FIG. 4 illustrates the rotation (as indicated by the arrow 80) and engagement of the second stop member 76 with the stop washer 78. Contact of the second stop member 76 with the stop washer 78 results in aligning the cylinder aperture 26 with the second sleeve aperture 46 thereby permitting the measured quantity of beans in the chamber 62 to flow from the chamber 62 into the grinding apparatus 68 therebelow.

Figure 3:
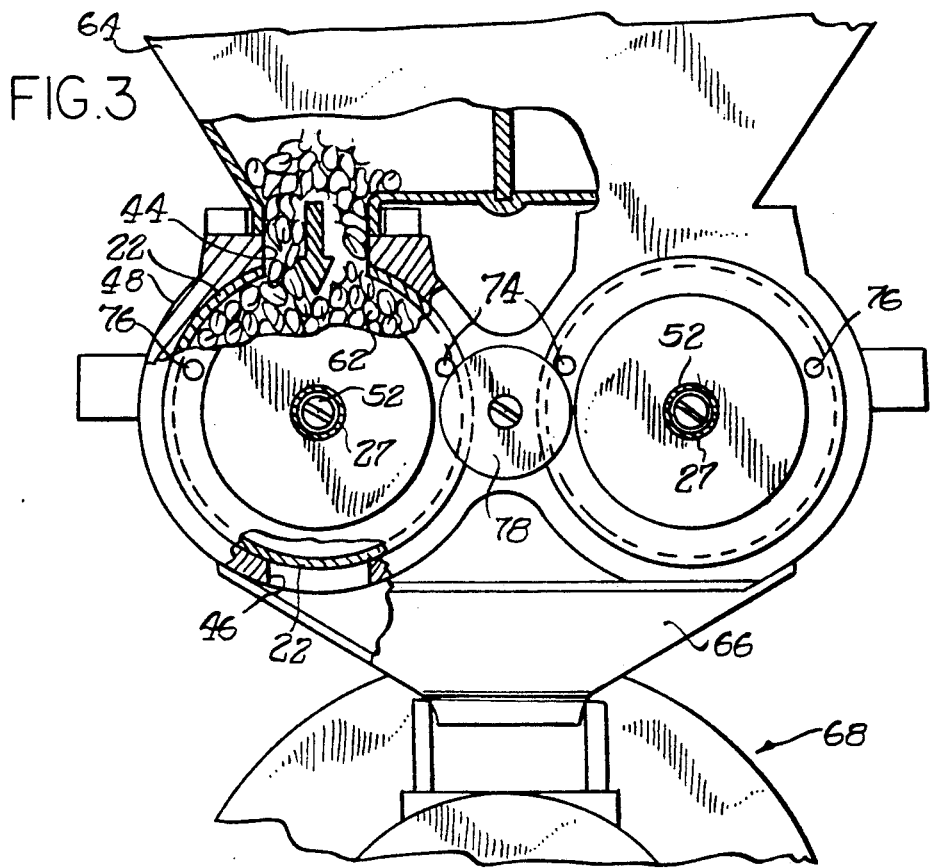
FIG. 3 is a partial fragmentary cross-sectional end view taken along line 3—3 in FIG. 2 showing a volume of material filling measuring chambers of the cylinders.

In use, as shown in FIGS. 3 and 4, the measuring apparatus 20 is positioned in the sleeve 42 between a dispensing chute 64 of a gravity feed material delivery hopper (not illustrated) and a receiving area 66 of a grinding apparatus 68. When the cylinder aperture 26 is rotatably selectively aligned with the sleeve aperture 44 in the top side 48 of the sleeve 42, the dispensing chute 64 dispenses material from the hopper under force of gravity into the measuring chamber 62 as shown in FIG. 3. Material ceases to flow from the dispensing chute 64 when the measuring chamber 62 is filled. Once the measuring chamber 62 is filled, the cylinder 22 is rotated within the sleeve 42 about the major axis 36 by a force applied to the handle member 24. When rotated, the cylinder aperture 26 is removed from alignment with the sleeve aperture 44 and selectively aligned with the second sleeve aperture 46 formed in the bottom side 50 of the sleeve 42. Aligned as such, material in the measuring chamber 62 flows therefrom under force of gravity into the receiving area 66 for grinding in the grinding apparatus 68 as shown in FIG. 4.

While a preferred embodiment of the present invention is shown and described, it is envisioned that those skilled in the art may devise modifications of the present invention without departing from the spirit and scope of the appended claims.

I claim:

1. An adjustable measuring apparatus for use with a material delivery hopper, said adjustable measuring apparatus comprising: at least one hollow sleeve having first and second sleeve apertures formed through spaced apart surfaces of said sleeve; a cylinder rotatably positioned in said sleeve, a cylinder aperture formed in said cylinder and selectively communicating with said first and second sleeve apertures; a piston adjustably retained in said cylinder for adjustably controlling a volume of said cylinder; a major axis coaxially extending through said sleeve, said cylinder and said piston; a hollow handle member attached to said cylinder for rotating said cylinder to selectively position said cylinder aperture in communication with said first and second sleeve apertures; adjustment means adjustably engaged with said cylinder and attached to said piston for adjustably positioning said piston in said cylinder, said adjustment means being axially positioned in said hollow handle member independent thereof and accessible for adjustment only by insertion of a tool into said hollow handle member for preventing undesired adjustment of said piston.

2. An adjustable measuring apparatus according to claim 1, wherein said adjustment means includes an engageable threaded shaft member generally coaxial with said major axis, a threaded nut attached to said cylinder generally coaxial with said major axis cooperatively engageable with said threaded shaft member such that rotation of said threaded shaft member engaged with said threaded nut attached to said piston adjustably axially moves said piston in said cylinder.

3. An adjustable measuring apparatus in combination with a grinding apparatus for use with a material delivery hopper, said adjustable measuring apparatus being positioned between said material delivering hopper and said grinding apparatus, said material delivery hopper including a dispensing chute, said grinding apparatus including a grinding mechanism in communication with said measuring apparatus, said adjustable measuring apparatus comprising: a hollow sleeve, first and second apertures extending through said sleeve and being positioned a spaced apart location thereon, one of said first and second apertures communicating with said dispensing chute and the other of said first and second apertures communicating with said receiving area; a cylinder rotatably retained in said sleeve, a cylinder aperture formed in said cylinder selectively communicating with said first and second sleeve apertures formed in said sleeve; a piston adjustably retained in and rotatable with said cylinder for adjustably controlling a measured volume of said cylinder; a major axis extending through said sleeve, said cylinder and said piston; adjustment means adjustably engaged with said cylinder and attached to said piston for adjustably positioning said piston in said cylinder, a hollow handle member attached to said cylinder independent of said adjustment means for rotating said cylinder, said handle member completely concealing said adjustment means for casual access and requiring a tool to be inserted into said hollow handle member to adjust said adjustment means for preventing undesired adjustment of said adjustment means, said adjustment means being axially retained and concealed to prevent undesired adjustment.

4. An adjustable measuring apparatus according to claim 3, wherein said adjustment means is a threaded shaft member generally coaxial with said major axis, a threaded bore formed in said cylinder generally coaxial with said major axis, said threaded bore being cooperatively engageable with said threaded shaft member such that rotation of said threaded shaft member engaged with said threaded bore attached to said piston adjustable axially moves said piston in said cylinder along said major axis.

5. An adjustable measuring apparatus for use with a material delivery hopper, said adjustable measuring apparatus comprising: a hollow sleeve, two sleeve apertures formed through spaced apart surfaces of said sleeve; a cylinder rotatably positioned in said sleeve, a cylinder aperture formed through a side of said cylinder and selectively communicating with said two sleeve apertures; a piston adjustably retained in said cylinder for adjustably controlling a volume of said cylinder; a major axis coaxially extending through said sleeve, said cylinder and said piston; a threaded adjustment member attached to said piston and coaxial with said major axis; a hollow handle member attached to said cylinder independent of said adjustment member for rotating said cylinder; a threaded nut attached to said cylinder coaxial with said major axis and cooperatively receiving said threaded adjustment member therein; said threaded adjustment member adjustably positioning said piston in said cylinder and being axially positioned and completely concealed in said hollow handle member for preventing undesired adjustment.

6. An adjustable measuring apparatus for repeatably measuring a selected measured volume, said measuring apparatus comprising: a cylinder operatively retained for axial rotation; a cylinder aperture formed in said cylinder; a piston adjustably retained in said cylinder for adjustably controlling said measured volume of said cylinder, a key attached to said piston and mating with said cylinder aperture for limiting said piston to axial movement within said cylinder; a major axis extending through said cylinder and said piston, a threaded nut attached to said cylinder coaxial with said major axis; a threaded adjustment member axially retained on said piston and threadedly engageable with said threaded nut attached to said cylinder for adjustably positioning said piston in said cylinder; a handle member attached to said cylinder independent of said attachment means for rotating said cylinder about said major axis; said adjustment member being concealed by said handle member and accessible therethrough for adjustment of said piston retained in said cylinder for adjustably controlling said measured volume of said cylinder.

7. An adjustable measuring apparatus according to claim 6, wherein a threaded fastener and a wave washer engage said threaded adjustment member and said piston, said threaded adjustment member being attached to said piston in a rotatable relationship for resisting vibration induced disengagement of said threaded fastener from said threaded adjustment member and thereby preventing movement of said piston in said cylinder.

8. An adjustable measuring apparatus for use with a material delivery hopper, said adjustable measuring apparatus comprising:
- a hollow sleeve having a first and a second sleeve aperture, said first and second sleeve apertures extending through a surface of said cylinder at spaced apart locations thereon;
- a cylinder positioned in said sleeve having an outside diameter substantially equalling an inside diameter of said sleeve, said cylinder being rotatable in said sleeve, a cylinder aperture formed in said cylinder and selectively separately positionable in communicating with said first and second sleeve apertures by rotating said cylinder within said sleeve;
- a piston adjustably retained inside said cylinder for adjustably controlling a volume of said cylinder;
- a major axis extending generally coaxially through said sleeve, said cylinder and said piston;
- a hollow handle member fixably attached to said cylinder to transferring a rotational force applied to said handle to said cylinder to rotate said cylinder inside of said sleeve rotating said cylinder to selectively position said cylinder aperture in communication with one of said first and second sleeve apertures;
- adjustment means adjustably engaging said cylinder and attached to said piston for adjustably positioning said piston in relation to said cylinder for adjusting a volume of said cylinder, said adjustment means axially extending in a generally non-contacting relation through said hollow handle member and being wholly retained inside of said hollow handle member for preventing undesired adjustment of said piston.

9. An adjustable measuring apparatus according to claim 8, wherein said adjustment means includes an engagable threaded shaft member coaxial with said major axis and rotatably attached to said piston, and a threaded nut attached to said cylinder cooperatively engaging said threaded shaft member such that rotation of said threaded shaft member engaged with said threaded nut adjustably moves said piston in said cylinder along said major axis.

10. An adjustable measuring apparatus according to claim 8, further including a key attached on an outside surface of said piston, said key being sized and dimensioned for mating with said cylinder aperture positioned inside of said sleeve, said key engaged with said cylinder aperture preventing rotation of said piston in said cylinder and permitting movement parallel to said major axis.

* * * * *

UNITED STATES PATENT AND TRADEMARK OFFICE
CERTIFICATE OF CORRECTION

PATENT NO. : 5,123,572
DATED : June 23,1992
INVENTOR(S) : David F. Ford

It is certified that error appears in the above-identified patent and that said Letters Patent is hereby corrected as shown below:

Column 2, Lines 32-33  " material source thereabove, a second sleeve aperture formed" should be -- material source thereabove, the second sleeve aperture formed --

Column 3, Line 8  " in which the cylinder has been rotated 180 to dispose" should be -- in which the cylinder has been rotated $180°$ to dispose --

Column 8, Line 8  " cylinder to transferring a rotational force applied " should be -- cylinder for transferring a rotational force  applied --

Signed and Sealed this

Twenty-first Day of September, 1993

Attest:

BRUCE LEHMAN

*Attesting Officer*           *Commissioner of Patents and Trademarks*